(12) United States Patent
Cui et al.

(10) Patent No.: US 9,986,531 B2
(45) Date of Patent: May 29, 2018

(54) POSITIONING INFORMATION PROCESSING METHOD AND APPARATUS

(71) Applicant: HUAWEI TECHNOLOGIES CO., LTD., Shenzhen, Guangdong (CN)

(72) Inventors: Jie Cui, Shenzhen (CN); Bin Su, Shenzhen (CN); Jiantao Xue, Beijing (CN); Yijie Li, Shenzhen (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/637,303

(22) Filed: Jun. 29, 2017

(65) Prior Publication Data
US 2017/0303234 A1 Oct. 19, 2017

Related U.S. Application Data

(63) Continuation of application No. PCT/CN2014/095862, filed on Dec. 31, 2014.

(51) Int. Cl.
*H04W 64/00* (2009.01)
*H04W 4/02* (2018.01)
*H04L 27/26* (2006.01)
*G01S 5/06* (2006.01)

(52) U.S. Cl.
CPC ............ *H04W 64/006* (2013.01); *G01S 5/06* (2013.01); *H04L 27/2613* (2013.01); *H04W 4/02* (2013.01)

(58) Field of Classification Search
CPC ........... H04W 64/00; H04W 4/02; G01S 5/06; H04L 27/26
See application file for complete search history.

(56) References Cited

U.S. PATENT DOCUMENTS 6,175,811 B1   1/2001   Tekinay
2012/0040696 A1*  2/2012   Siomina ................ G01S 5/0036
                                                455/456.6

(Continued)

FOREIGN PATENT DOCUMENTS

CN   103997783   8/2014
CN   104050254   9/2014

(Continued)

OTHER PUBLICATIONS

International Search Report dated Sep. 24, 2015 in corresponding International Patent Application No. PCT/CN2014/095862.

(Continued)

*Primary Examiner* — Mehmood B Khan
(74) *Attorney, Agent, or Firm* — Staas & Halsey LLP

(57) ABSTRACT

Embodiments of the present invention provide a positioning information processing method and apparatus. The method includes: receiving, by a test terminal, a cell-specific reference signal sent by a base station, and obtaining an original cell-specific reference signal; obtaining, by the test terminal, a multipath characteristic quantity according to the received cell-specific reference signal and the original cell-specific reference signal; and sending, by the test terminal to a server, RSRP, timing information, and a multipath characteristic quantity that are corresponding to each test site, so that the server implements a positioning service.

12 Claims, 9 Drawing Sheets

(56) References Cited

U.S. PATENT DOCUMENTS

| | | | |
|---|---|---|---|
| 2013/0065581 A1* | 3/2013 | Hwang | H04B 17/336 455/422.1 |
| 2013/0243130 A1* | 9/2013 | Lee | H04L 25/022 375/340 |
| 2014/0233457 A1* | 8/2014 | Koutsimanis | H04J 11/005 370/328 |
| 2014/0323153 A1 | 10/2014 | Xiao et al. | |
| 2015/0131749 A1* | 5/2015 | Slomina | H04J 11/005 375/260 |

FOREIGN PATENT DOCUMENTS

| WO | WO2012024516 | 2/2012 |
|---|---|---|
| WO | 2013091580 | 6/2013 |
| WO | WO2013172772 | 11/2013 |

OTHER PUBLICATIONS

Reza Monir Vaghefi et al.: "Cooperative RF Pattern Matching Positioning for LTE Cellular Systems," 2014 IEEE 25th International Symposium on Personal, Indoor and Mobile Radio Communications, 2014, 6 pages.

3GPP TS 36.101 V12.5.0 (Sep. 2014): "3rd Generation Partnership Project; Technical Specification Group Radio Access Network; Evolved Universal Terrestrial Radio Access (E-UTRA);User Equipment (UE) radio transmission and reception(Release 12)," Sep. 2014, 536 pages.

3GPP TR 36.809 V12.0.0 (Sep. 2013): "3rd Generation Partnership Project; Technical Specification Group Radio Access Network; Radio Frequency (RF) pattern matching location method in LTE (Release 12)," Sep. 2013, 23 pages.

del Peral-Rosado, J., *Evaluation of the LTE Positioning Capabilities in Realistic Navigation Channels*, XP-55198565 (182 pp.).

Polaris Wireless, *LTR architecture for RFPM (Paragraph 5) and Informaiton Theoretic simulation methodology (Paragraph 6.1) in TR 36.809*, TSG-RAN Working Group 4 (Radio) meeting #60bis, Zhuhai, People's Republic of China, Oct. 10, 2011, R4-115155, XP-50544220 (14 pp.).

Extended European Search Report, dated Dec. 18, 2017, in European Application No. 14909476.5 (14 pp.).

\* cited by examiner

US 9,986,531 B2

POSITIONING INFORMATION PROCESSING METHOD AND APPARATUS

CROSS-REFERENCE TO RELATED APPLICATIONS

This application is a continuation of International Application No. PCT/CN2014/095862, filed on Dec. 31, 2014, the disclosure of which is hereby incorporated by reference in its entirety.

TECHNICAL FIELD

Embodiments of the present invention relate to the field of communications technologies, and in particular, to a positioning information processing method and apparatus.

BACKGROUND

With development of communications technologies, a positioning service has become an indispensable part of mobile communication and personal communication. Location information of a mobile terminal held by a user is obtained by using an operator network and a corresponding geographical location is displayed on an electronic map. This brings great convenience to daily life of people.

In a radio frequency pattern matching (RFPM for short) technology, which is one of positioning technologies, a professional test device receives, at a test site, a reference signal sent by a base station, to obtain reference signal received power (RSRP for short), and the professional test device obtains timing information according to a timing request sent by the professional test device to the base station and a received timing response returned by the base station, so as to establish a correspondence among the RSRP, the timing information, and location information of each test site to form a database. In an actual positioning process, RSRP and timing information that are corresponding to the user terminal are matched with corresponding data in a database to obtain location information corresponding to the user terminal.

In the prior art, because a relatively small quantity of characteristic quantities (RSRP and timing information) are used for matching, it is difficult to achieve high RFPM positioning accuracy; and particularly, when timing information cannot be accurately obtained, RFPM positioning accuracy is lower because only the RSRP is used to perform matching.

SUMMARY

Embodiments of the present invention provide a positioning information processing method and apparatus, so as to improve RFPM positioning accuracy.

An aspect of the embodiments of the present invention provides a positioning information processing method, including:

receiving, by a test terminal, a cell-specific reference signal sent by a base station, and obtaining an original cell-specific reference signal;

obtaining, by the test terminal, a multipath characteristic quantity according to the received cell-specific reference signal and the original cell-specific reference signal, where the multipath characteristic quantity refers to characteristic information of a time-domain correlation spectrum that is corresponding to the cell-specific reference signal received by the test terminal and the original cell-specific reference signal; and sending, by the test terminal to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

Another aspect of the embodiments of the present invention provides a positioning information processing method, including:

receiving, by a user terminal, a cell-specific reference signal sent by a base station, and obtaining an original cell-specific reference signal;

obtaining, by the user terminal, a target multipath characteristic quantity according to the received cell-specific reference signal and the original cell-specific reference signal, where the target multipath characteristic quantity represents characteristic information of a time-domain correlation spectrum that is corresponding to the cell-specific reference signal received by the user terminal and the original cell-specific reference signal; and sending, by the user terminal to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, where the database includes a correspondence among RSRP, timing information, a multipath characteristic quantity, and test site location information.

Another aspect of the embodiments of the present invention provides a positioning method, including:

receiving, by a server, RSRP, timing information, and a multipath characteristic quantity that are sent by a test terminal and that are corresponding to each test site, where the multipath characteristic quantity refers to characteristic information of a time-domain correlation spectrum that is corresponding to a cell-specific reference signal received by the test terminal and an original cell-specific reference signal;

establishing, by the server, a database, where the database includes a correspondence among the RSRP, the timing information, the multipath characteristic quantity, and test site location information;

receiving, by the server, target RSRP, target timing information, and a target multipath characteristic quantity that are sent by a user terminal, where the target multipath characteristic quantity represents characteristic information of a time-domain correlation spectrum that is corresponding to a cell-specific reference signal received by the user terminal and an original cell-specific reference signal; and matching, by the server, the target RSRP, the target timing information, and the target multipath characteristic quantity with corresponding data in the database to obtain location information corresponding to the user terminal.

Another aspect of the embodiments of the present invention provides a test terminal, including:

a first receiving and obtaining module, configured to receive a cell-specific reference signal sent by a base station, and obtain an original cell-specific reference signal;

a first multipath characteristic quantity obtaining module, configured to obtain a multipath characteristic quantity according to the received cell-specific reference signal and the original cell-specific reference signal, where the multipath characteristic quantity refers to characteristic information of a time-domain correlation spectrum that is corresponding to the cell-specific reference signal received by the test terminal and the original cell-specific reference signal; and a first sending module, configured to send, to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

Another aspect of the embodiments of the present invention provides a user terminal, including:

a second receiving and obtaining module, configured to receive a cell-specific reference signal sent by a base station, and obtain an original cell-specific reference signal;

a second multipath characteristic quantity obtaining module, configured to obtain a target multipath characteristic quantity according to the received cell-specific reference signal and the original cell-specific reference signal, where the target multipath characteristic quantity represents characteristic information of a time-domain correlation spectrum that is corresponding to the cell-specific reference signal received by the user terminal and the original cell-specific reference signal; and a second sending module, configured to send, to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, where the database includes a correspondence among RSRP, timing information, a multipath characteristic quantity, and test site location information.

Another aspect of the embodiments of the present invention provides a server, including:

a receiving module, configured to: receive RSRP, timing information, and a multipath characteristic quantity that are sent by a test terminal and that are corresponding to each test site, where the multipath characteristic quantity refers to characteristic information of a time-domain correlation spectrum that is corresponding to a cell-specific reference signal received by the test terminal and an original cell-specific reference signal; and receive target RSRP, target timing information, and a target multipath characteristic quantity that are sent by a user terminal, where the target multipath characteristic quantity represents characteristic information of a time-domain correlation spectrum that is corresponding to a cell-specific reference signal received by the user terminal and an original cell-specific reference signal;

a database establishment module, configured to establish a database, where the database includes a correspondence among the RSRP, the timing information, the multipath characteristic quantity, and test site location information; and a matching module, configured to match the target RSRP, the target timing information, and the target multipath characteristic quantity with corresponding data in the database to obtain location information corresponding to the user terminal.

Another aspect of the embodiments of the present invention provides a positioning information processing system, including the test terminal, the user terminal, and the server.

According to the positioning information processing method and apparatus that are provided in the embodiments of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

DESCRIPTION OF EMBODIMENTS

In embodiments of the present invention, a radio area covered by a base station is pre-divided into multiple small grids, each small grid serves as one test site, and a drive test is performed at the test site by using a test terminal. Drive test information is specifically a signal characteristic of each small grid, and the signal characteristic includes RSRP, timing information, and a multipath characteristic quantity that are corresponding to the test site. The RSRP represents signal strength of a reference signal that is sent by the base station and that is received by the test terminal at the test site. The timing information represents a period from a moment when the test terminal sends a timing request to the base station to a moment when the test terminal receives a timing response returned by the base station, and the RSRP and the timing information that are corresponding to the test site may be obtained by using any related existing technology.

Figure 1:
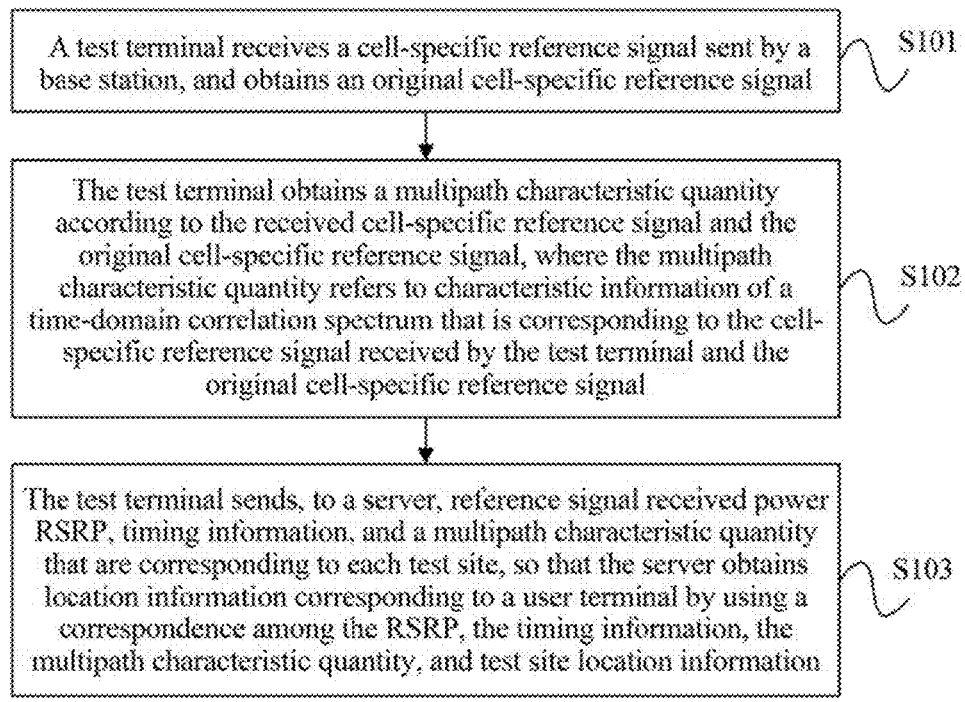
FIG. 1 is a flowchart of a positioning information processing method according to an embodiment of the present invention.
Figure 2:
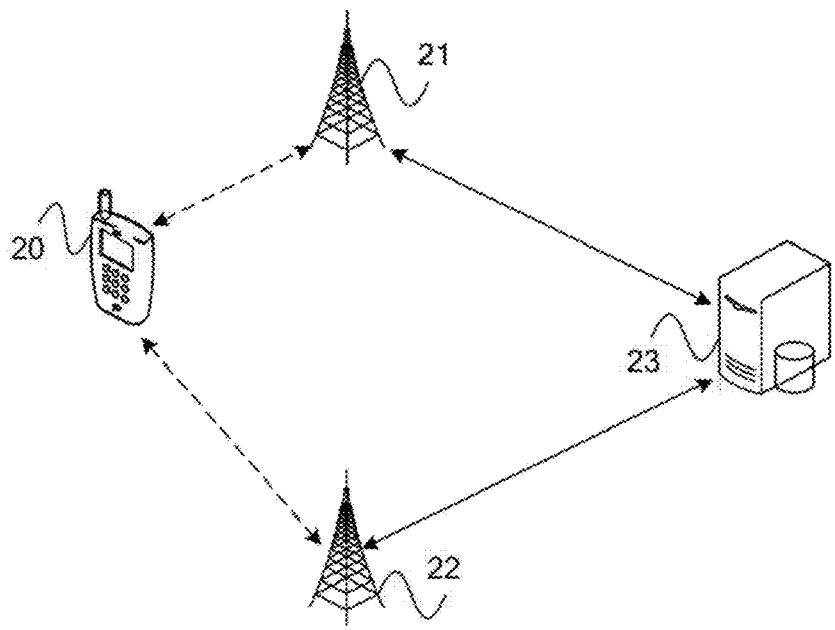
FIG. 2 is a diagram of a network architecture to which a positioning information processing method is applicable according to an embodiment of the present invention.

FIG. 1 is a flowchart of a positioning information processing method according to an embodiment of the present invention. FIG. 2 is a diagram of a network architecture to which a positioning information processing method is applicable according to an embodiment of the present invention. In this embodiment of the present invention, for a case in which a few characteristic quantities are used for matching in an existing positioning method, a multipath characteristic quantity is added, and the multipath characteristic quantity is used as a characteristic quantity used for matching, so as to implement RFPM positioning. Steps of a specific positioning method are as follows:

Step S101: A test terminal receives a cell-specific reference signal sent by a base station, and obtains an original cell-specific reference signal.

In this embodiment of the present invention, the test terminal is specifically a high-accuracy mobile terminal device 20 in FIG. 2. As shown in FIG. 2, a base station 21 sends a cell-specific reference signal to the high-accuracy mobile terminal device 20, and the high-accuracy mobile terminal device 20 obtains a received cell-specific reference signal. Because the cell-specific reference signal is delayed and attenuated when being transmitted over a radio channel, the cell-specific reference signal received by the high-accuracy mobile terminal device 20 may be different from the cell-specific reference signal sent by the base station 21. In addition, the base station 21 sends a configuration of the cell-specific reference signal to the high-accuracy mobile terminal device 20, and the high-accuracy mobile terminal device 20 generates an original cell-specific reference signal according to the configuration.

Step S102: The test terminal obtains a multipath characteristic quantity according to the received cell-specific reference signal and the original cell-specific reference signal, where the multipath characteristic quantity refers to characteristic information of a time-domain correlation spectrum that is corresponding to the cell-specific reference signal received by the test terminal and the original cell-specific reference signal.

That the test terminal obtains a multipath characteristic quantity according to the received cell-specific reference signal and the original cell-specific reference signal includes: performing, by the test terminal, time-domain correlation on the received cell-specific reference signal and the original cell-specific reference signal to obtain the time-domain correlation spectrum; and obtaining, by the test terminal, the multipath characteristic quantity according to the time-domain correlation spectrum.

The high-accuracy mobile terminal device 20 performs time-domain correlation on the received cell-specific reference signal and the original cell-specific reference signal to obtain the time-domain correlation spectrum, obtains the characteristic information of the time-domain correlation spectrum by analyzing the time-domain correlation spectrum, and uses the characteristic information of the time-domain correlation spectrum as the multipath characteristic quantity.

Step S103: The test terminal sends, to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

The high-accuracy mobile terminal device 20 sends, to a server 23 by using the base station 21, a signal characteristic (RSRP, timing information, and a multipath characteristic quantity) of each small grid in a radio area covered by the base station 21. Likewise, the high-accuracy mobile terminal device 20 may further obtain a signal characteristic (RSRP, timing information, and a multipath characteristic quantity) of each small grid in a radio area covered by a base station 22, and send the signal characteristic to the server 23 by using the base station 22.

The server 23 establishes a correspondence among RSRP, timing information, a multipath characteristic quantity, and the test site location information, where the RSRP, the timing information, and the multipath characteristic quantity are corresponding to each test site, that is, each grid in a radio area covered by each base station; and forms a database. The user terminal sends, to the server, target RSRP, target timing information, and a target multipath characteristic quantity that are corresponding to the user terminal, and the server matches the target RSRP, the target timing information, and the target multipath characteristic quantity with corresponding data in the database to obtain location information corresponding to the user terminal.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 3:
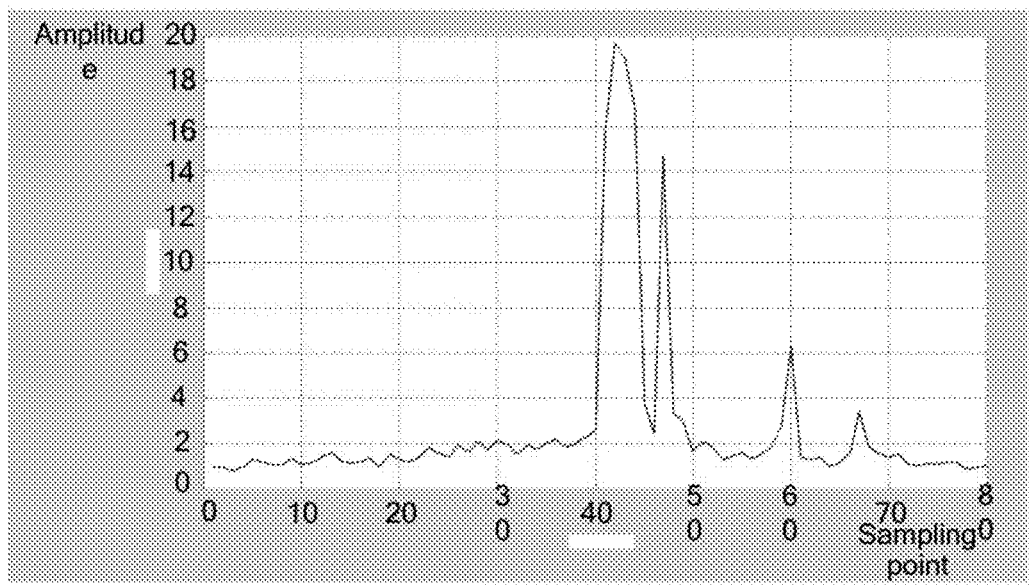
FIG. 3 is a schematic diagram of a time-domain correlation spectrum according to an embodiment of the present invention.
Figure 4:
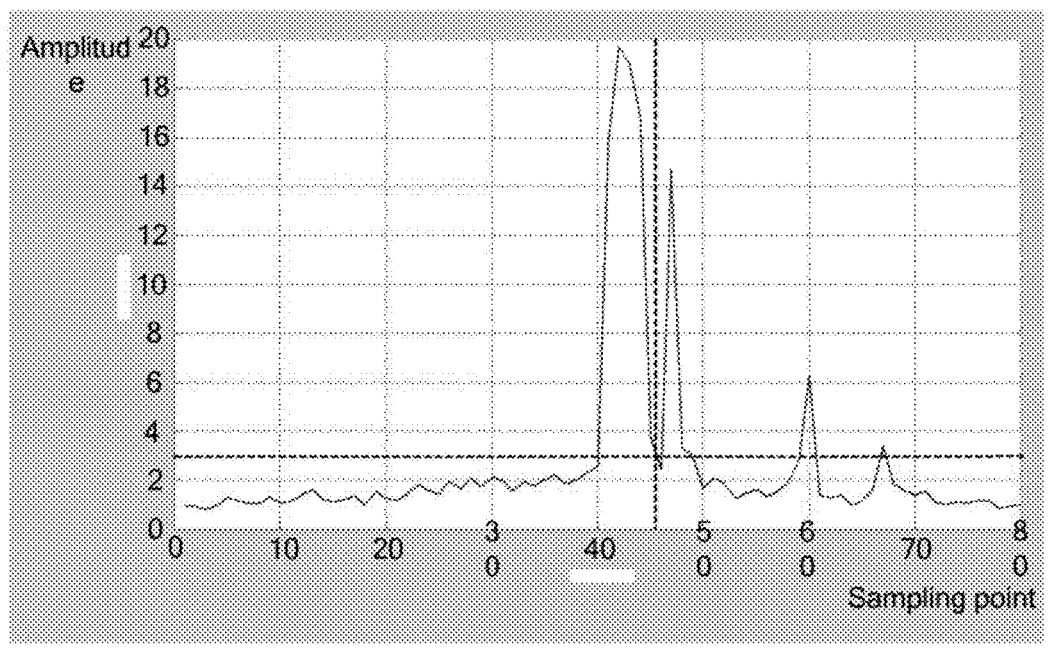
FIG. 4 is a schematic diagram of a time-domain correlation spectrum according to another embodiment of the present invention.

FIG. 3 is a schematic diagram of a time-domain correlation spectrum according to another embodiment of the present invention. FIG. 4 is a schematic diagram of a time-domain correlation spectrum according to another embodiment of the present invention. Based on the foregoing embodiment, a multipath characteristic quantity includes a quantity of main-path sampling points on a time-domain correlation spectrum and a quantity of secondary paths on the time-domain correlation spectrum.

On the time-domain correlation spectrum, a discrete time point or a sampling point is used as a horizontal coordinate, and an amplitude is used as a vertical coordinate; the quantity of main-path sampling points is a quantity of discrete time points or sampling points whose amplitudes are greater than a preset main-path amplitude on the time-domain correlation spectrum, and the quantity of secondary paths is a quantity of peaks, except a peak of the main path, whose peak values are greater than a preset secondary-path amplitude on the time-domain correlation spectrum.

FIG. 3 shows the time-domain correlation spectrum obtained by performing time-domain correlation on the received cell-specific reference signal and the original cell-specific reference signal. On the time-domain correlation spectrum, a sampling point is used as a horizontal coordinate, and an amplitude is used as a vertical coordinate. The multipath characteristic quantity includes the quantity of main-path sampling points on the time-domain correlation spectrum and the quantity of secondary paths on the time-domain correlation spectrum. The quantity of main-path sampling points is a quantity of sampling points whose amplitudes are greater than the preset main-path amplitude on the time-domain correlation spectrum, and the quantity of secondary paths is the quantity of peaks, except a peak of the main path, whose peak values are greater than a preset secondary-path amplitude on the time-domain correlation spectrum.

As shown in FIG. 3, the sampling point is specifically represented by a chip, the preset main-path amplitude is set to 8.75, a quantity of chips whose amplitudes are greater than 8.75 on the time-domain correlation spectrum is 5, that is, the quantity of main-path sampling points is 5. 1Ts=1/(15000*2048)s, and 1Ts is a smallest granularity in a time domain in an LTE physical-layer specification. In addition, in a bandwidth of 10 MHz, 1 chip=2Ts. If a discrete time point is used as a horizontal coordinate in FIG. 3, Ts is specifically used to represent the discrete time point.

As shown in FIG. 4, a path whose peak value is relatively low and that can be relatively easily identified is selected as the secondary path, that is, a path on a right side of a vertical dashed line. If the preset secondary-path amplitude is set to 3, the quantity of peaks, except a peak of the main path, whose peak values are greater than 3 is 3, that is, the quantity of secondary paths is 3.

In this embodiment of the present invention, a multipath characteristic quantity includes a quantity of main-path sampling points on a time-domain correlation spectrum and a quantity of secondary paths on the time-domain correlation spectrum, and a method for determining the quantity of main-path sampling points and the quantity of secondary paths is specifically provided. In addition, if an LTE receiver in the prior art obtains the multipath characteristic quantity by performing time-domain correlation by using this embodiment of the present invention, a problem in the prior art that it is difficult to obtain a multipath characteristic quantity by using a rake receiver is resolved.

Figure 5:
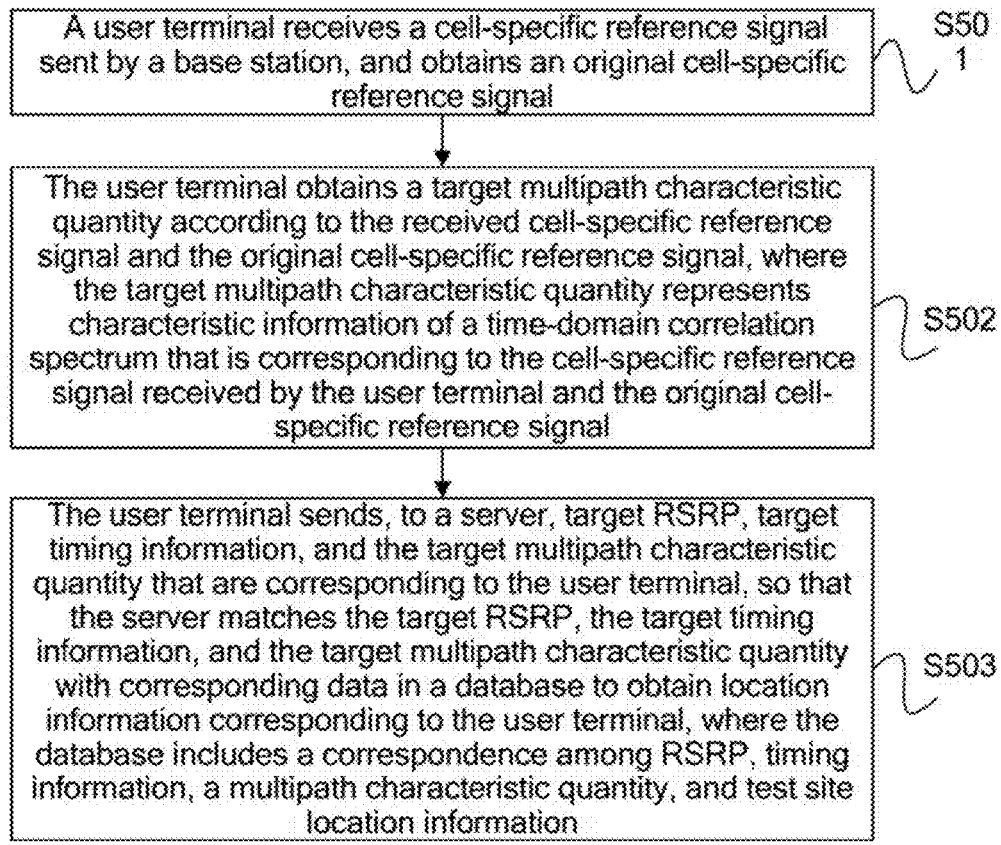
FIG. 5 is a flowchart of a positioning information processing method according to another embodiment of the present invention.
Figure 6:
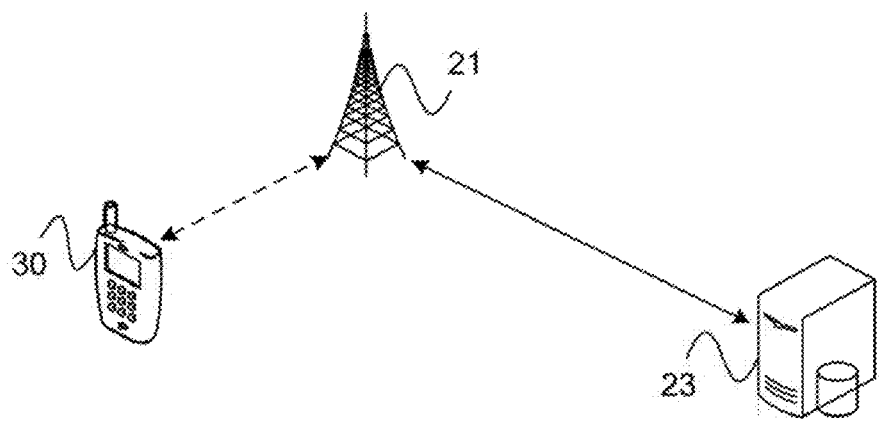
FIG. 6 is a diagram of a network architecture to which a positioning information processing method is applicable according to another embodiment of the present invention.

FIG. 5 is a flowchart of a positioning information processing method according to another embodiment of the present invention. FIG. 6 is a diagram of a network architecture to which a positioning information processing method is applicable according to another embodiment of the present invention. Steps of a positioning method provided in this embodiment of the present invention are as follows:

Step S501: A user terminal receives a cell-specific reference signal sent by a base station, and obtains an original cell-specific reference signal.

As shown in FIG. 6, it is assumed that a user terminal 30 is in a coverage area of a base station 21, the base station 21 sends a cell-specific reference signal to the user terminal 30, and the user terminal 30 obtains a received cell-specific reference signal and an original cell-specific reference signal. A specific obtaining process is the same as the process in which the high-accuracy mobile terminal device 20 in the foregoing embodiments obtains corresponding information, and details are not described herein again.

Step S502: The user terminal obtains a target multipath characteristic quantity according to the received cell-specific reference signal and the original cell-specific reference signal, where the target multipath characteristic quantity represents characteristic information of a time-domain correlation spectrum that is corresponding to the cell-specific reference signal received by the user terminal and the original cell-specific reference signal.

In this embodiment of the present invention, the user terminal 30 is provided with a module for performing time-domain correlation, and a process in which the user terminal 30 obtains a target multipath characteristic quantity is the same as the process in which the test terminal obtains the multipath characteristic quantity in step S102 in the foregoing embodiment.

Step S503: The user terminal sends, to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, where the database includes a correspondence among RSRP, timing information, a multipath characteristic quantity, and test site location information.

The user terminal 30 sends, to a server 23, target RSRP, target timing information, and a target multipath characteristic quantity that are corresponding to the user terminal 30. The server 23 matches the target RSRP, the target timing information, and the target multipath characteristic quantity with corresponding data in the database. Test site location information obtained by matching is location information corresponding to the user terminal 30.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 7:
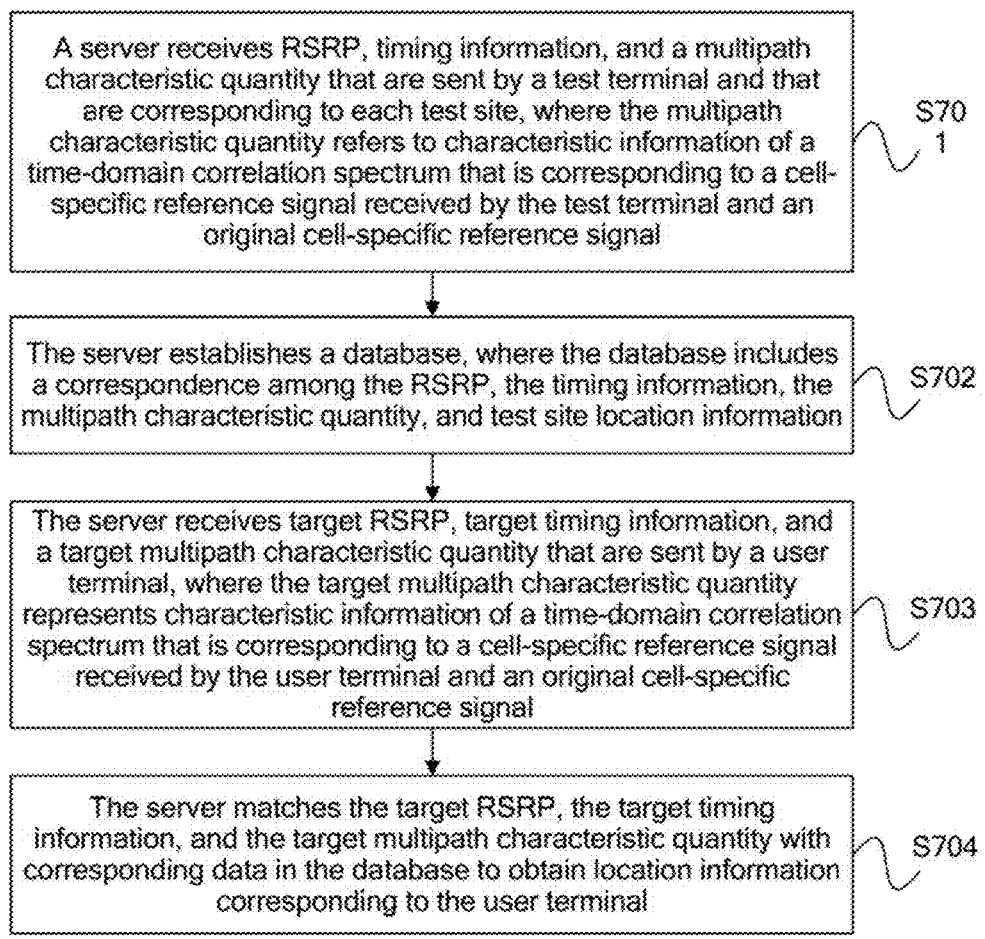
FIG. 7 is a flowchart of a positioning method according to an embodiment of the present invention.

FIG. 7 is a flowchart of a positioning method according to another embodiment of the present invention. Steps of the positioning method provided in this embodiment of the present invention are as follows:

Step S701: A server receives RSRP, timing information, and a multipath characteristic quantity that are sent by a test terminal and that are corresponding to each test site, where the multipath characteristic quantity refers to characteristic information of a time-domain correlation spectrum that is corresponding to a cell-specific reference signal received by the test terminal and an original cell-specific reference signal.

Step S702: The server establishes a database, where the database includes a correspondence among the RSRP, the timing information, the multipath characteristic quantity, and test site location information.

Step S701 and step S702 are a process in which the server receives the RSRP, the timing information, and the multipath characteristic quantity that are sent by the test terminal and that are corresponding to each test site, and establishes the database. A process in which the test terminal obtains the RSRP, the timing information, and the multipath characteristic quantity that are corresponding to each test site is the same as that in the foregoing embodiments, and the database established by the server is the same as the database in the foregoing embodiments.

Step S703: The server receives target RSRP, target timing information, and a target multipath characteristic quantity that are sent by a user terminal, where the target multipath characteristic quantity represents characteristic information of a time-domain correlation spectrum that is corresponding to a cell-specific reference signal received by the user terminal and an original cell-specific reference signal.

Step S704: The server matches the target RSRP, the target timing information, and the target multipath characteristic quantity with corresponding data in the database to obtain location information corresponding to the user terminal.

Step S703 and step S704 are a process in which the server receives the target RSRP, the target timing information, and the target multipath characteristic quantity that are sent by the user terminal, and matches the target RSRP, the target timing information, and the target multipath characteristic quantity with corresponding data in the database to obtain the location information of the user terminal. The process is the same as that in the method in the foregoing embodiments, and details are not described herein again.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 8:
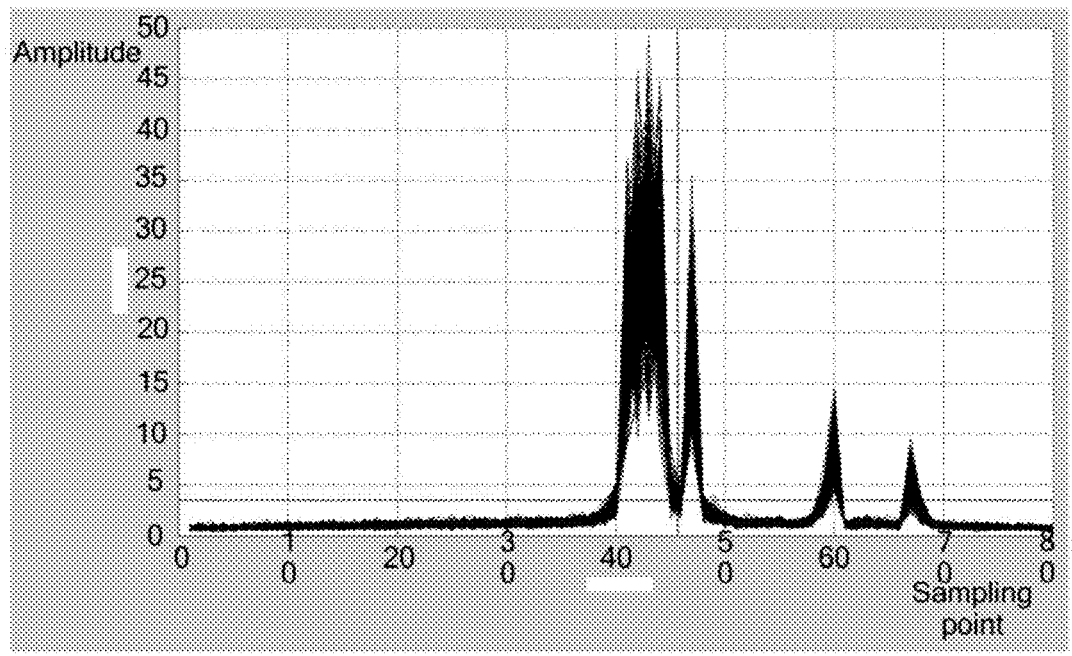
FIG. 8 to FIG. 12 are schematic diagrams of superposing multiple time-domain correlation spectrums according to an embodiment of the present invention.

FIG. 8 to FIG. 12 are schematic diagrams of superposing multiple time-domain correlation spectrums according to an embodiment of the present invention. FIG. 8 is a diagram obtained by simulating superposition of 1000 time-domain correlation spectrums under the condition that a bandwidth between a test terminal and a base station is 10 MHz, a channel model is ETU, a transmit signal is an LTE signal, and SNR=0 dB. It may be learned, by analyzing statistics of the 1000 time-domain correlation spectrums, that when a preset main-path amplitude is set to 12, time-domain correlation spectrums in which a quantity of main-path sampling points is 4 account for 9.2%, time-domain correlation spectrums in which a quantity of main-path sampling points is 5 account for 86.8%, and time-domain correlation spectrums in which a quantity of main-path sampling points is 6 account for 4%. When a preset secondary-path amplitude is set to 3, time-domain correlation spectrums in which a quantity of secondary paths is 1 account for 0%, time-domain correlation spectrums in which a quantity of secondary paths is 2 account for 2.7%, time-domain correlation spectrums in which a quantity of secondary paths is 3 account for 96.4%, and time-domain correlation spectrums in which a quantity of secondary paths is 4 account for 0.9%.

Figure 9:
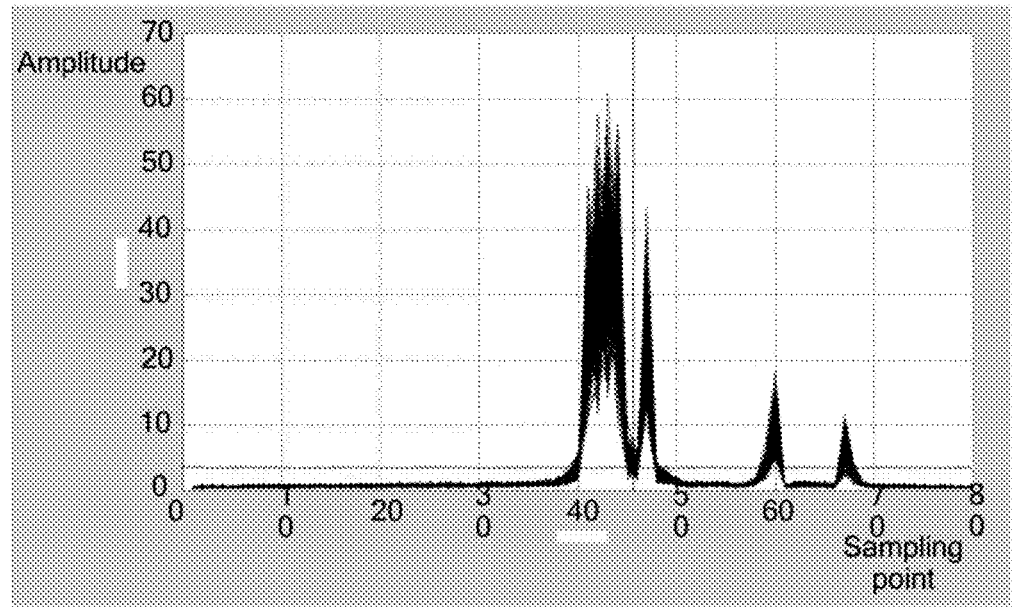

FIG. 9 is a diagram obtained by simulating superposition of 1000 time-domain correlation spectrums under the condition that a bandwidth between a test terminal and a base station is 10 MHz, a channel model is ETU, a transmit signal is an LTE signal, and SNR=3 dB. It may be learned, by analyzing statistics of the 1000 time-domain correlation spectrums, that when a preset main-path amplitude is set to 14.5, time-domain correlation spectrums in which a quantity of main-path sampling points is 4 account for 8.8%, time-domain correlation spectrums in which a quantity of main-path sampling points is 5 account for 87.7%, and time-domain correlation spectrums in which a quantity of main-path sampling points is 6 account for 3.5%. When a preset secondary-path amplitude is set to 3, time-domain correlation spectrums in which a quantity of secondary paths is 1 account for 0%, time-domain correlation spectrums in which a quantity of secondary paths is 2 account for 1.9%, time-domain correlation spectrums in which a quantity of secondary paths is 3 account for 97.6%, and time-domain correlation spectrums in which a quantity of secondary paths is 4 account for 0.5%.

Figure 10:
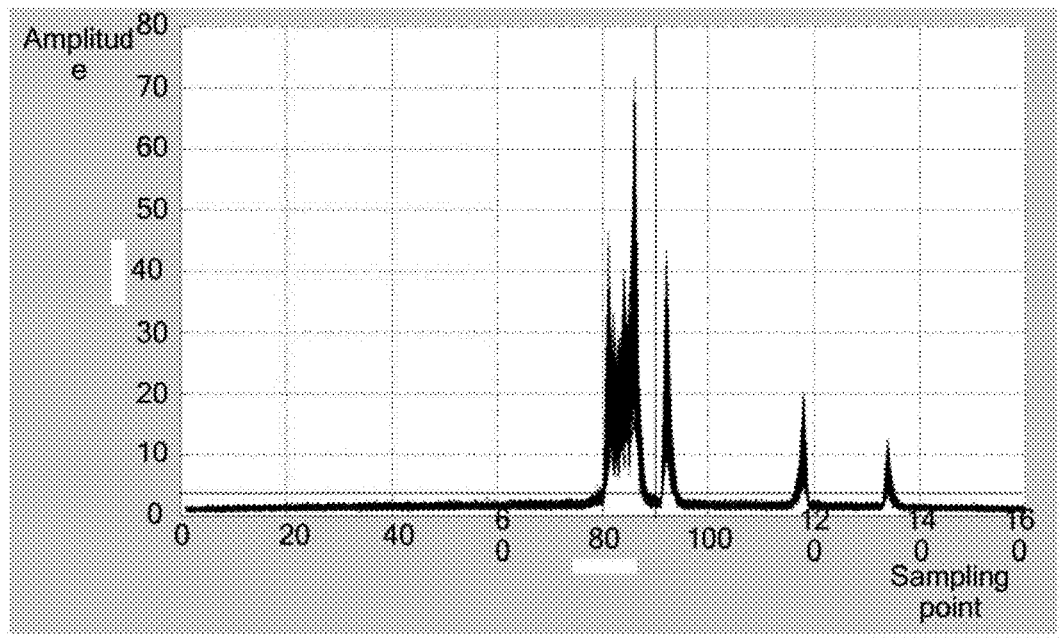

FIG. 10 is a diagram obtained by simulating superposition of 1000 time-domain correlation spectrums under the condition that a bandwidth between a test terminal and a base station is 20 MHz, a channel model is ETU, a transmit signal is an LTE signal, and SNR=−3 dB. It may be learned, by analyzing statistics of the 1000 time-domain correlation spectrums, that when a preset secondary-path amplitude is set to 3, time-domain correlation spectrums in which a quantity of secondary paths is 3 account for 100%.

Figure 11:
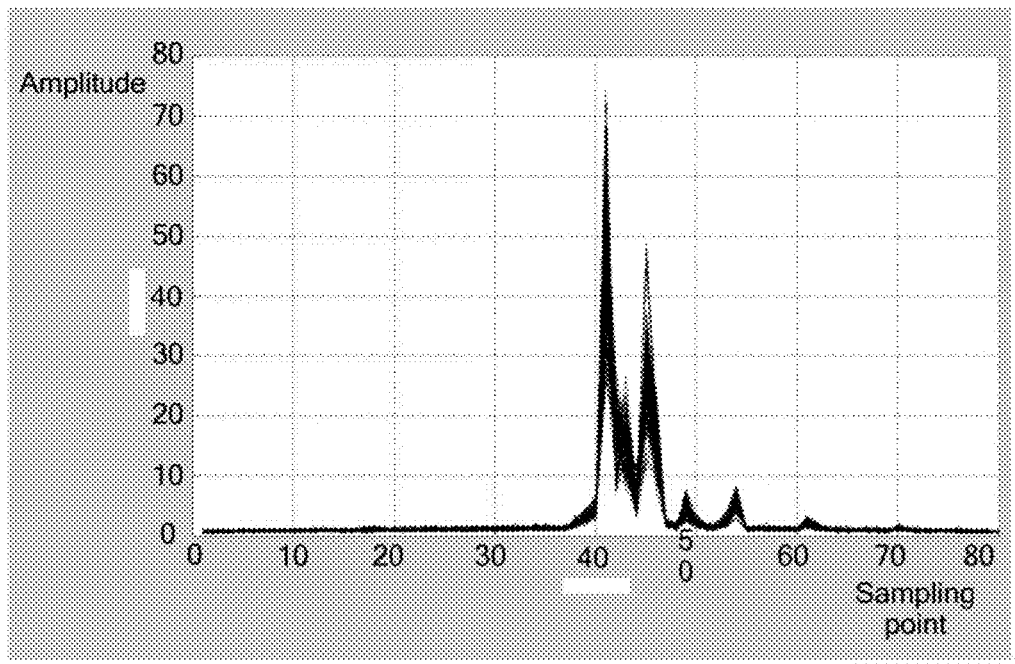

FIG. 11 is a diagram obtained by simulating superposition of 1000 time-domain correlation spectrums under the condition that a bandwidth between a test terminal and a base station is 10 MHz, a channel model is EVA, a transmit signal is an LTE signal, and SNR=0 dB. It may be learned, by analyzing statistics of the 1000 time-domain correlation spectrums, that when a preset main-path amplitude is set to 8, time-domain correlation spectrums in which a quantity of main-path sampling points is 4 account for 2.8%, time-domain correlation spectrums in which a quantity of main-path sampling points is 5 account for 87.8%, and time-domain correlation spectrums in which a quantity of main-path sampling points is 6 account for 9.4%.

Figure 12:
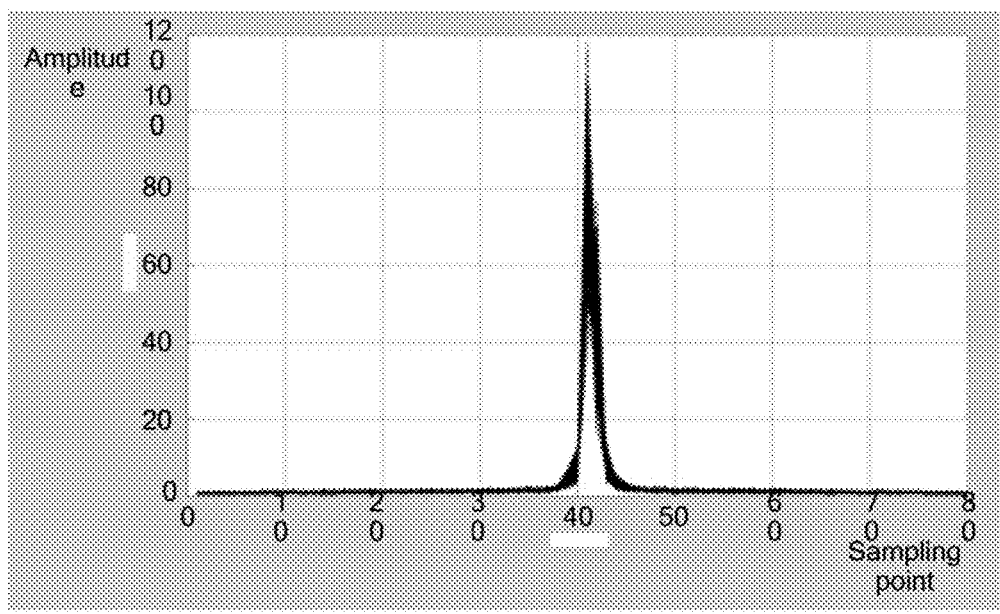

FIG. 12 is a diagram obtained by simulating superposition of 1000 time-domain correlation spectrums under the condition that a bandwidth between a test terminal and a base station is 10 MHz, a channel model is EPA, a transmit signal is an LTE signal, and SNR=0 dB. It may be learned, by analyzing statistics of the 1000 time-domain correlation spectrums, that when a preset main-path amplitude is set to 15, time-domain correlation spectrums in which a quantity of main-path sampling points is 1 account for 0%, and time-domain correlation spectrums in which a quantity of main-path sampling points is 3 account for 100%.

According to time-domain correlation spectrums obtained by simulating conditions including different bandwidths, different channel models, different transmit signals, and different SNRs, it may be learned that corresponding multipath characteristic quantities between a same test terminal and a same base station are typically a fixed value; for example, quantities of main-path sampling points are typically 5, and quantities of secondary paths are typically 3. If the fixed value is used as a correct measurement result, the test terminal or the user terminal in the foregoing embodiments obtains only one time-domain correlation spectrum, and test accuracy that is obtained by analyzing the time-domain correlation spectrum and that is of the multipath characteristic quantity is an occurrence probability of the fixed value. Because the fixed value has a relatively high occurrence probability, the multipath characteristic quantity obtained by analyzing the time-domain correlation spectrum in this embodiment of the present invention has relatively high accuracy, and a test result is relatively stable.

Figure 13:
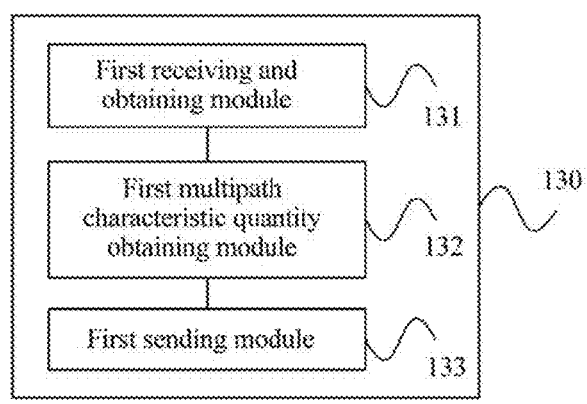
FIG. 13 is a structural diagram of a test terminal according to an embodiment of the present invention.

FIG. 13 is a structural diagram of a test terminal according to an embodiment of the present invention. The test terminal provided in this embodiment of the present invention may perform a processing procedure provided in the positioning method embodiment. As shown in FIG. 13, the test terminal 130 includes a first receiving and obtaining module 131, a first multipath characteristic quantity obtaining module 132, and a first sending module 133. The first receiving and obtaining module 131 is configured to receive a cell-specific reference signal sent by a base station, and obtain an original cell-specific reference signal. The first multipath characteristic quantity obtaining module 132 is configured to obtain a multipath characteristic quantity according to the received cell-specific reference signal and the original cell-specific reference signal, where the multipath characteristic quantity refers to characteristic information of a time-domain correlation spectrum that is corresponding to the cell-specific reference signal received by the test terminal and the original cell-specific reference signal. The first sending module 133 is configured to send, to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Based on the foregoing embodiment, the first multipath characteristic quantity obtaining module 132 is specifically configured to: perform time-domain correlation on the received cell-specific reference signal and the original cell-specific reference signal to obtain the time-domain correlation spectrum; and obtain the multipath characteristic quantity according to the time-domain correlation spectrum.

The multipath characteristic quantity includes a quantity of main-path sampling points on the time-domain correlation spectrum and a quantity of secondary paths on the time-domain correlation spectrum.

On the time-domain correlation spectrum, a discrete time point or a sampling point is used as a horizontal coordinate, and an amplitude is used as a vertical coordinate; the quantity of main-path sampling points is a quantity of discrete time points or sampling points whose amplitudes are greater than a preset main-path amplitude on the time-domain correlation spectrum, and the quantity of secondary paths is a quantity of peaks, except a peak of the main path, whose peak values are greater than a preset secondary-path amplitude on the time-domain correlation spectrum.

The test terminal provided in this embodiment of the present invention may be specifically configured to perform the method embodiment provided in the foregoing FIG. 1, and a specific function is not described herein again.

In this embodiment of the present invention, a multipath characteristic quantity includes a quantity of main-path sampling points on a time-domain correlation spectrum and a quantity of secondary paths on the time-domain correlation spectrum, and a method for determining the quantity of main-path sampling points and the quantity of secondary paths is specifically provided.

Figure 14:
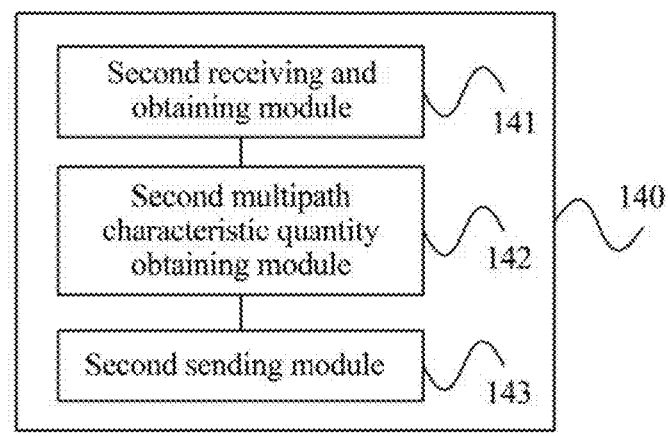
FIG. 14 is a structural diagram of a user terminal according to an embodiment of the present invention.

FIG. 14 is a structural diagram of a user terminal according to an embodiment of the present invention. The user terminal provided in this embodiment of the present invention may perform a processing procedure provided in the positioning method embodiment. As shown in FIG. 14, a user terminal 140 includes a second receiving and obtaining module 141, a second multipath characteristic quantity obtaining module 142, and a second sending module 143. The second receiving and obtaining module 141 is configured to receive a cell-specific reference signal sent by a base station, and obtain an original cell-specific reference signal. The second multipath characteristic quantity obtaining module 142 is configured to obtain a target multipath characteristic quantity according to the received cell-specific reference signal and the original cell-specific reference signal, where the target multipath characteristic quantity represents characteristic information of a time-domain correlation spectrum that is corresponding to the cell-specific reference signal received by the user terminal and the original cell-specific reference signal. The second sending module 143 is configured to send, to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, where the database includes a correspondence among RSRP, timing information, a multipath characteristic quantity, and test site location information.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 15:
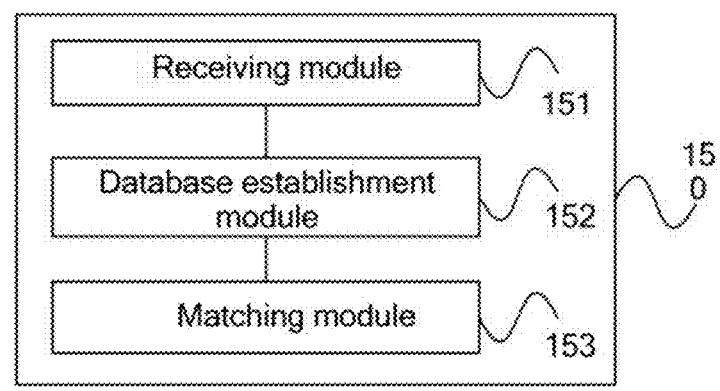
FIG. 15 is a structural diagram of a server according to an embodiment of the present invention.

FIG. 15 is a structural diagram of a server according to an embodiment of the present invention. The server provided in this embodiment of the present invention may perform a processing procedure provided in the positioning method embodiment. As shown in FIG. 15, a server 150 includes a receiving module 151, a database establishment module 152, and a matching module 153. The receiving module 151 is configured to: receive RSRP, timing information, and a multipath characteristic quantity that are sent by a test terminal and that are corresponding to each test site, where the multipath characteristic quantity refers to characteristic information of a time-domain correlation spectrum that is corresponding to a cell-specific reference signal received by the test terminal and an original cell-specific reference signal; and receive target RSRP, target timing information, and a target multipath characteristic quantity that are sent by a user terminal, where the target multipath characteristic quantity represents characteristic information of a time-domain correlation spectrum that is corresponding to a cell-specific reference signal received by the user terminal and an original cell-specific reference signal. The database establishment module 152 is configured to establish a database, where the database includes a correspondence among the RSRP, the timing information, the multipath characteristic quantity, and test site location information. The matching module 153 is configured to match the target RSRP, the target timing information, and the target multipath characteristic quantity with corresponding data in the database to obtain location information corresponding to the user terminal.

The server provided in this embodiment of the present invention may perform the processing procedure provided in the positioning method embodiment.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 16:
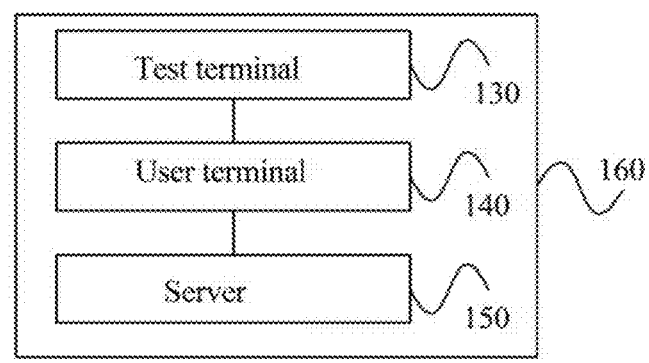
FIG. 16 is a structural diagram of a positioning information processing system according to an embodiment of the present invention.

FIG. 16 is a structural diagram of a positioning information processing system according to an embodiment of the present invention. The positioning information processing system provided in this embodiment of the present invention may perform a processing procedure provided in the positioning method embodiment. As shown in FIG. 16, a positioning information processing system 160 includes the test terminal 130, the user terminal 140, and the server 150 in the foregoing embodiments.

The positioning information processing system provided in this embodiment of the present invention may perform the processing procedure provided in the positioning method embodiment.

Figure 17:
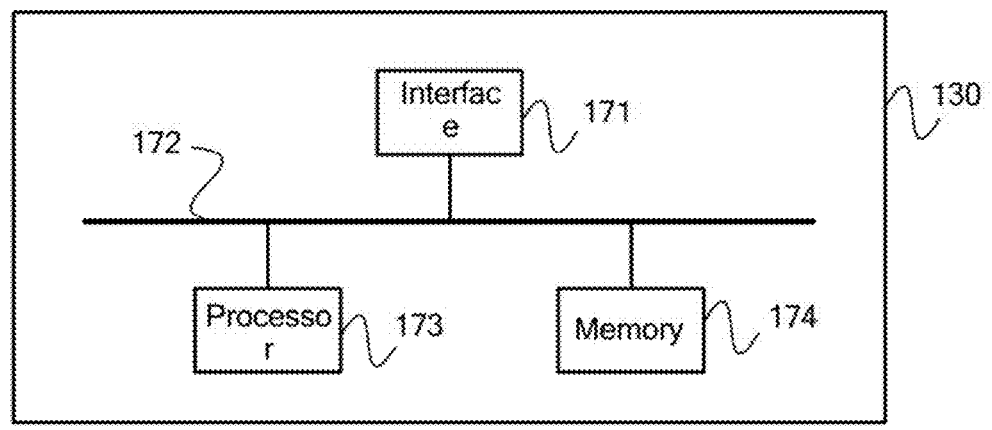
FIG. 17 is a structural diagram of a test terminal according to another embodiment of the present invention.

FIG. 17 is a structural diagram of a test terminal according to another embodiment of the present invention. The test terminal provided in this embodiment of the present invention may perform a processing procedure provided in the positioning method embodiment. As shown in FIG. 17, the test terminal 130 includes a bus 172, and an interface 171, a processor 173, and a memory 174 that are connected to the bus 172. The interface 171 is configured to: receive a cell-specific reference signal sent by a base station; and send, to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information. The memory 174 is configured to store an instruction and the cell-specific reference signal that is received by the interface 171 and that is sent by the base station. The processor 173 is configured to execute the instruction stored in the memory 174 to perform the following operations: obtaining an original cell-specific reference signal; and obtaining the multipath characteristic quantity according to the received cell-specific reference signal and the original cell-specific reference signal, where the multipath characteristic quantity refers to characteristic information of a time-domain correlation spectrum that is corresponding to the cell-specific reference signal received by the test terminal and the original cell-specific reference signal.

In this embodiment of the present invention, optionally, the processor 173 is specifically configured to perform the following operations: performing time-domain correlation on the received cell-specific reference signal and the original cell-specific reference signal to obtain the time-domain correlation spectrum; and obtaining the multipath characteristic quantity according to the time-domain correlation spectrum.

In this embodiment of the present invention, optionally, the multipath characteristic quantity includes a quantity of main-path sampling points on the time-domain correlation spectrum and a quantity of secondary paths on the time-domain correlation spectrum.

In this embodiment of the present invention, optionally, on the time-domain correlation spectrum, a discrete time point or a sampling point is used as a horizontal coordinate, and an amplitude is used as a vertical coordinate; the quantity of main-path sampling points is a quantity of discrete time points or sampling points whose amplitudes are greater than a preset main-path amplitude on the time-domain correlation spectrum, and the quantity of secondary paths is a quantity of peaks, except a peak of the main path, whose peak values are greater than a preset secondary-path amplitude on the time-domain correlation spectrum.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 18:
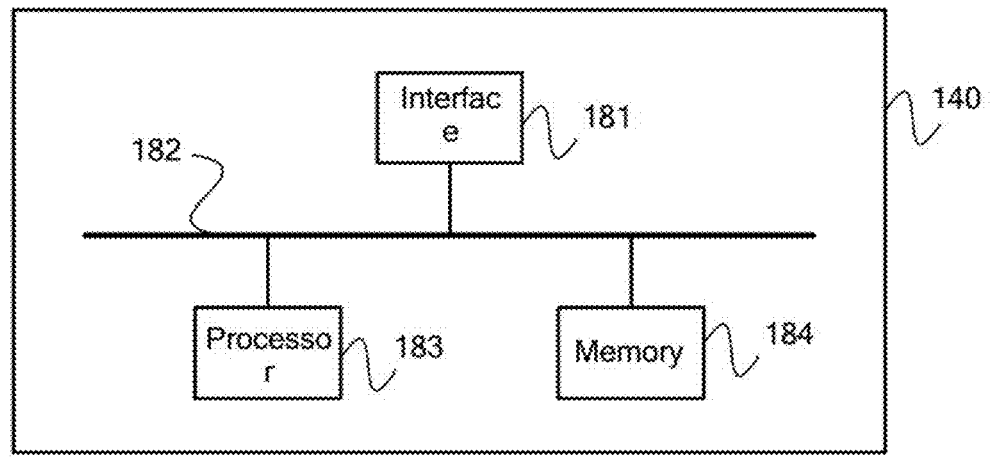
FIG. 18 is a structural diagram of a user terminal according to another embodiment of the present invention.

FIG. 18 is a structural diagram of a user terminal according to another embodiment of the present invention. The user terminal provided in this embodiment of the present invention may perform a processing procedure provided in the positioning method embodiment. As shown in FIG. 18, the user terminal 140 includes a bus 182, and an interface 181, a processor 183, and a memory 184 that are connected to the bus 182. The interface 181 is configured to: receive a cell-specific reference signal sent by a base station; send, to a server, target RSRP, target timing information, and a target multipath characteristic quantity that are corresponding to the user terminal, so that the server matches the target RSRP, the target timing information, and the target multipath characteristic quantity with corresponding data in a database to obtain location information corresponding to the user terminal, where the database includes a correspondence among RSRP, timing information, a multipath characteristic quantity, and test site location information. The memory 184 is configured to store an instruction and the cell-specific reference signal that is received by the interface 181 and that is sent by the base station. The processor 183 is configured to execute the instruction stored in the memory 184 to perform the following steps: obtaining an original cell-specific reference signal; and obtaining the target multipath characteristic quantity according to the received cell-specific reference signal and the original cell-specific reference signal, where the target multipath characteristic quantity represents characteristic information of a time-domain correlation spectrum that is corresponding to the cell-specific reference signal received by the user terminal and the original cell-specific reference signal.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

Figure 19:
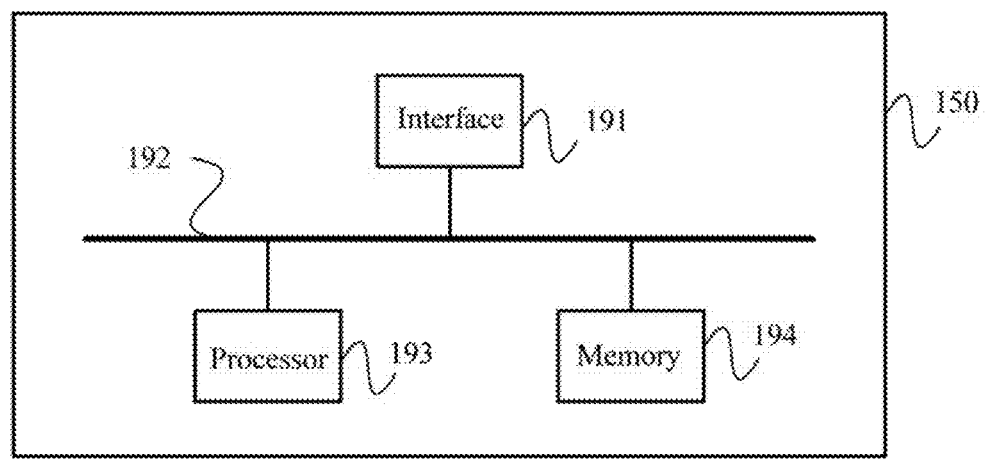
FIG. 19 is a structural diagram of a server according to another embodiment of the present invention.

FIG. 19 is a structural diagram of a server according to another embodiment of the present invention. The server provided in this embodiment of the present invention may perform a processing procedure provided in the positioning method embodiment. As shown in FIG. 19, the server 150 includes a bus 192, and an interface 191, a processor 193, and a memory 194 that are connected to the bus 192. The interface 191 is configured to: receive RSRP, timing information, and a multipath characteristic quantity that are sent by a test terminal and that are corresponding to each test site, where the multipath characteristic quantity refers to characteristic information of a time-domain correlation spectrum that is corresponding to a cell-specific reference signal received by the test terminal and an original cell-specific reference signal; and receive target RSRP, target timing information, and a target multipath characteristic quantity that are sent by a user terminal, where the target multipath characteristic quantity represents characteristic information of a time-domain correlation spectrum that is corresponding to a cell-specific reference signal received by the user terminal and an original cell-specific reference signal. The memory 194 is configured to: store an instruction; store RSRP, timing information, and a multipath characteristic quantity that are sent by the test terminal, that are corresponding to each test site, and that are received by the interface 191; and store the target RSRP, the target timing information, and the target multipath characteristic quantity that are sent by the user terminal and that are received by the interface 191. The processor 193 is configured to execute the instruction stored in the memory 194 to perform the following steps: establishing a database, where the database includes a correspondence among the RSRP, the timing information, the multipath characteristic quantity, and test site location information; and matching the target RSRP, the target timing information, and the target multipath characteristic quantity with corresponding data in the database to obtain location information corresponding to the user terminal.

In this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP.

An embodiment of the present invention provides a positioning information processing system, so as to perform a processing procedure provided in the positioning method embodiment. The positioning information processing system provided in this embodiment of the present invention may be specifically obtained by replacing the test terminal 130, the user terminal 140, and the server 150 in FIG. 16 with the test terminal 130 shown in FIG. 17, the user terminal 140 shown in FIG. 18, and the server 150 shown in FIG. 19.

The positioning information processing system provided in this embodiment of the present invention may perform the processing procedure provided in the positioning method embodiment.

In conclusion, in this embodiment of the present invention, a multipath characteristic quantity is added as a characteristic quantity used for matching in a positioning method, that is, positioning matching is performed by using RSRP, timing information, and the multipath characteristic quantity. RFPM positioning accuracy is improved when being compared with accuracy of positioning matching performed by using the RSRP and the timing information; and particularly, when the timing information cannot be accurately obtained, positioning matching performed by using the RSRP and the multipath characteristic quantity has higher accuracy when being compared with positioning matching performed by using only the RSRP. The multipath characteristic quantity includes a quantity of main-path sampling points on a time-domain correlation spectrum and a quantity of secondary paths on the time-domain correlation spectrum, and a method for determining the quantity of main-path sampling points and the quantity of secondary paths is specifically provided. In addition, if an LTE receiver in the prior art obtains the multipath characteristic quantity by performing time-domain correlation by using this embodiment of the present invention, a problem in the prior art that it is difficult to obtain a multipath characteristic quantity by using a rake receiver is resolved. Finally, according to time-domain correlation spectrums obtained by simulating conditions including different bandwidths, different channel models, different transmit signals, and different SNRs, it may be learned that corresponding multipath characteristic quantities between a same test terminal and a same base station are typically a fixed value; for example, quantities of main-path sampling points are typically 5, and quantities of secondary paths are typically 3. If the fixed value is used as a correct measurement result, the test terminal or the user terminal in the foregoing embodiments obtains only one time-domain correlation spectrum, and test accuracy that is obtained by analyzing the time-domain correlation spectrum and that is of the multipath characteristic quantity is an occurrence probability of the fixed value. Because the fixed value has a relatively high occurrence probability, the multipath characteristic quantity obtained by analyzing the time-domain correlation spectrum in this embodiment of the present invention has relatively high accuracy, and a test result is relatively stable.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) or a processor (processor) to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A positioning information processing method, comprising:
    receiving, by a test terminal, a cell-specific reference signal sent by a base station, and obtaining an original cell-specific reference signal;
    obtaining, by the test terminal, a multipath characteristic quantity according to the received cell-specific reference signal and the original cell-specific reference signal, wherein the multipath characteristic quantity refers to characteristic information of a time-domain correlation spectrum that is corresponding to the cell-specific reference signal received by the test terminal and the original cell-specific reference signal; and
    sending, by the test terminal to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

2. The method according to claim 1, wherein the obtaining, by the test terminal, a multipath characteristic quantity according to the received cell-specific reference signal and the original cell-specific reference signal comprises:
    performing, by the test terminal, time-domain correlation on the received cell-specific reference signal and the original cell-specific reference signal to obtain the time-domain correlation spectrum; and obtaining, by the test terminal, the multipath characteristic quantity according to the time-domain correlation spectrum.

3. The method according to claim 1, wherein the multipath characteristic quantity comprises a quantity of main-path sampling points on the time-domain correlation spectrum and a quantity of secondary paths on the time-domain correlation spectrum.

4. The method according to claim 3, wherein on the time-domain correlation spectrum, a discrete time point or a sampling point is used as a horizontal coordinate, and an amplitude is used as a vertical coordinate; and
    the quantity of main-path sampling points is a quantity of discrete time points or sampling points whose amplitudes are greater than a preset main-path amplitude on the time-domain correlation spectrum, and the quantity of secondary paths is a quantity of peaks, except a peak of the main path, whose peak values are greater than a preset secondary-path amplitude on the time-domain correlation spectrum.

5. A positioning information processing method, comprising:
    receiving, by a user terminal, a cell-specific reference signal sent by a base station, and obtaining an original cell-specific reference signal;
    obtaining, by the user terminal, a target multipath characteristic quantity according to the received cell-specific reference signal and the original cell-specific reference signal, wherein the target multipath characteristic quantity represents characteristic information of a time-domain correlation spectrum that is corresponding to the cell-specific reference signal received by the user terminal and the original cell-specific reference signal; and
    sending, by the user terminal to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, wherein the database comprises a correspondence among RSRP, timing information, a multipath characteristic quantity, and test site location information.

6. A positioning method, comprising:
    receiving, by a server RSRP, timing information, and a multipath characteristic quantity that arc sent by a test terminal and that are corresponding to each test site, wherein the multipath characteristic quantity refers to characteristic information of a time-domain correlation spectrum that is corresponding to a cell-specific reference signal received by the test terminal and an original cell-specific reference signal;
    establishing, by the server, a database, wherein the database comprises a correspondence among the RSRP, the timing information, the multipath characteristic quantity, and test site location information;

receiving, by the server, target RSRP, target timing information, and a target multipath characteristic quantity that are sent by a user terminal, wherein the target multipath characteristic quantity represents characteristic information of a time-domain correlation spectrum that is corresponding to a cell-specific reference signal received by the user terminal and an original cell-specific reference signal; and matching, by the server, the target RSRP, the target timing information, and the target multipath characteristic quantity with corresponding data in the database to obtain location information corresponding to the user terminal.

7. A test terminal, comprising:

a first receiving and obtaining module, configured to receive a cell-specific reference signal sent by a base station, and obtain an original cell-specific reference signal;

a first multipath characteristic quantity obtaining module, configured to obtain a multipath characteristic quantity according to the received cell-specific reference signal and the original cell-specific reference signal, wherein the multipath characteristic quantity refers to characteristic information of a time-domain correlation spectrum that is corresponding to the cell-specific reference signal received by the first receiving and obtaining module and the original cell-specific reference signal; and a first sending module, configured to send, to a server, reference signal received power RSRP, timing information, and a multipath characteristic quantity that are corresponding to each test site, so that the server obtains location information corresponding to a user terminal by using a correspondence among the RSRP, the timing information, the multipath characteristic quantity, and test site location information.

8. The test terminal according to claim 7, wherein the first multipath characteristic quantity obtaining module is specifically configured to: perform time-domain correlation on the received cell-specific reference signal and the original cell-specific reference signal to obtain the time-domain correlation spectrum; and obtain the multipath characteristic quantity according to the time-domain correlation spectrum.

9. The test terminal according to claim 7, wherein the multipath characteristic quantity comprises a quantity of main-path sampling points on the time-domain correlation spectrum and a quantity of secondary paths on the time-domain correlation spectrum.

10. The test terminal according to claim 9, wherein on the time-domain correlation spectrum, a discrete time point or a sampling point is used as a horizontal coordinate, and an amplitude is used as a vertical coordinate; and the quantity of main-path sampling points is a quantity of discrete time points or sampling points whose amplitudes are greater than a preset main-path amplitude on the time-domain correlation spectrum, and the quantity of secondary paths is a quantity of peaks, except a peak of the main path, whose peak values are greater than a preset secondary-path amplitude on the time-domain correlation spectrum.

11. A user terminal, comprising:

a second receiving and obtaining module, configured to receive a cell-specific reference signal sent by a base station, and obtain an original cell-specific reference signal;

a second multipath characteristic quantity obtaining module, configured to obtain a target multipath characteristic quantity according to the received cell-specific reference signal and the original cell-specific reference signal, wherein the target multipath characteristic quantity represents characteristic information of a time-domain correlation spectrum that is corresponding to the cell-specific reference signal received by the second receiving and obtaining module and the original cell-specific reference signal; and a second sending module, configured to send, to a server, target RSRP, target timing information, and the target multipath characteristic quantity that are corresponding to the user terminal, so that the server matches the target RSRP, the target timing information, and the target multipath characteristic quantity with corresponding data in a database to obtain location information corresponding to the user terminal, wherein the database comprises a correspondence among RSRP, timing information, a multipath characteristic quantity, and test site location information.

12. A server, comprising:

a receiving module, configured to: receive RSRP, timing information, and a multipath characteristic quantity that are sent by a test terminal and that are corresponding to each test site, wherein the multipath characteristic quantity refers to characteristic information of a time-domain correlation spectrum that is corresponding to a cell-specific reference signal received by the test terminal and an original cell-specific reference signal; and receive target RSRP, target timing information, and a target multipath characteristic quantity that are sent by a user terminal, wherein the target multipath characteristic quantity represents characteristic information of a time-domain correlation spectrum that is corresponding to a cell-specific reference signal received by the user terminal and an original cell-specific reference signal;

a database establishment module, configured to establish a database, wherein the database comprises a correspondence among the RSRP, the timing information, the multipath characteristic quantity, and test site location information; and a matching module, configured to match the target RSRP, the target timing information, and the target multipath characteristic quantity with corresponding data in the database to obtain location information corresponding to the user terminal.

* * * * *

UNITED STATES PATENT AND TRADEMARK OFFICE
CERTIFICATE OF CORRECTION

PATENT NO. : 9,986,531 B2
APPLICATION NO. : 15/637303
DATED : May 29, 2018
INVENTOR(S) : Jie Cui et al.

It is certified that error appears in the above-identified patent and that said Letters Patent is hereby corrected as shown below:

In the Claims

Column 18, Line 57:
In Claim 6, after "by a server" insert -- , -- therefore.

Column 18, Line 58:
In Claim 6, delete "arc" and insert -- are -- therefore.

Signed and Sealed this
Tenth Day of July, 2018

Andrei Iancu
*Director of the United States Patent and Trademark Office*